United States Patent [19]
Barnard

[11] Patent Number: 5,657,669
[45] Date of Patent: Aug. 19, 1997

[54] LAWNMOWER CABLE CONTROL APPARATUS

[75] Inventor: Michael A. Barnard, Wichita, Kans.

[73] Assignee: Wescon Products Company, Wichita, Kans.

[21] Appl. No.: 509,510

[22] Filed: Jul. 31, 1995

[51] Int. Cl.$^6$ .................................................. F16C 1/22
[52] U.S. Cl. ............................................. 74/502.4; 74/527
[58] Field of Search .............................. 74/502.4, 502.6, 74/527, 10 R, 10.1

[56] References Cited

U.S. PATENT DOCUMENTS

| | | |
|---|---|---|
| D. 344,090 | 2/1994 | Barnard. |
| 1,876,731 | 9/1932 | Neate ..................... 74/502.4 |
| 2,612,051 | 9/1952 | Felt ........................ 74/527 X |
| 3,393,578 | 7/1968 | Tschanz ................. 74/502.4 |
| 4,038,508 | 7/1977 | Mapelsden ............ 74/527 X |
| 4,909,094 | 3/1990 | Yoshigai ............ 74/502.4 X |
| 5,321,994 | 6/1994 | Barnard. |

FOREIGN PATENT DOCUMENTS

| | | | |
|---|---|---|---|
| 2 317 543 | 2/1977 | France .................. 74/502.6 |
| 2 459 509 | 2/1981 | France .................... 74/10.1 |

*Primary Examiner*—Charles A. Marmor
*Assistant Examiner*—Mary Ann Battista
*Attorney, Agent, or Firm*—Hovey, Williams, Timmons & Collins

[57] ABSTRACT

In a walk-behind, powered lawnmower, a cable control apparatus is provided for supporting at least two different cable assemblies. The apparatus includes a housing for supporting the outer conduits of the cables at a fixed position on the handlebar of the mower and a fastener for fastening the housing to the handlebar. A throttle lever is supported on the housing for pivotal movement, the free end of the first cable being connected to the throttle lever so that movement of the lever is transmitted to the motor by the first cable, adjusting the speed of the motor. The free end of the second cable extends beyond the cable control apparatus and is connected to a separate ground drive lever so that movement of the ground drive lever is transmitted to the ground drive assembly by the second cable, actuating the ground drive assembly. The control apparatus includes an adjustment apparatus for removing slack from the second cable assembly. The adjustment apparatus includes a polygonal channel formed in the housing and sized for receipt of the ground drive conduit fitting so that engagement between the fitting and the channel prevents the fitting from rotating relative to the housing. A turnbuckle is received for threaded engagement on the fitting and is supported at a fixed axial position along the channel so that the turnbuckle can be rotated to adjust the position of the fitting within the channel. A detent is also provided for biasing the turnbuckle toward each of a plurality of rotational positions so that the biasing force must be overcome to rotate the turnbuckle from each position in either direction.

3 Claims, 3 Drawing Sheets

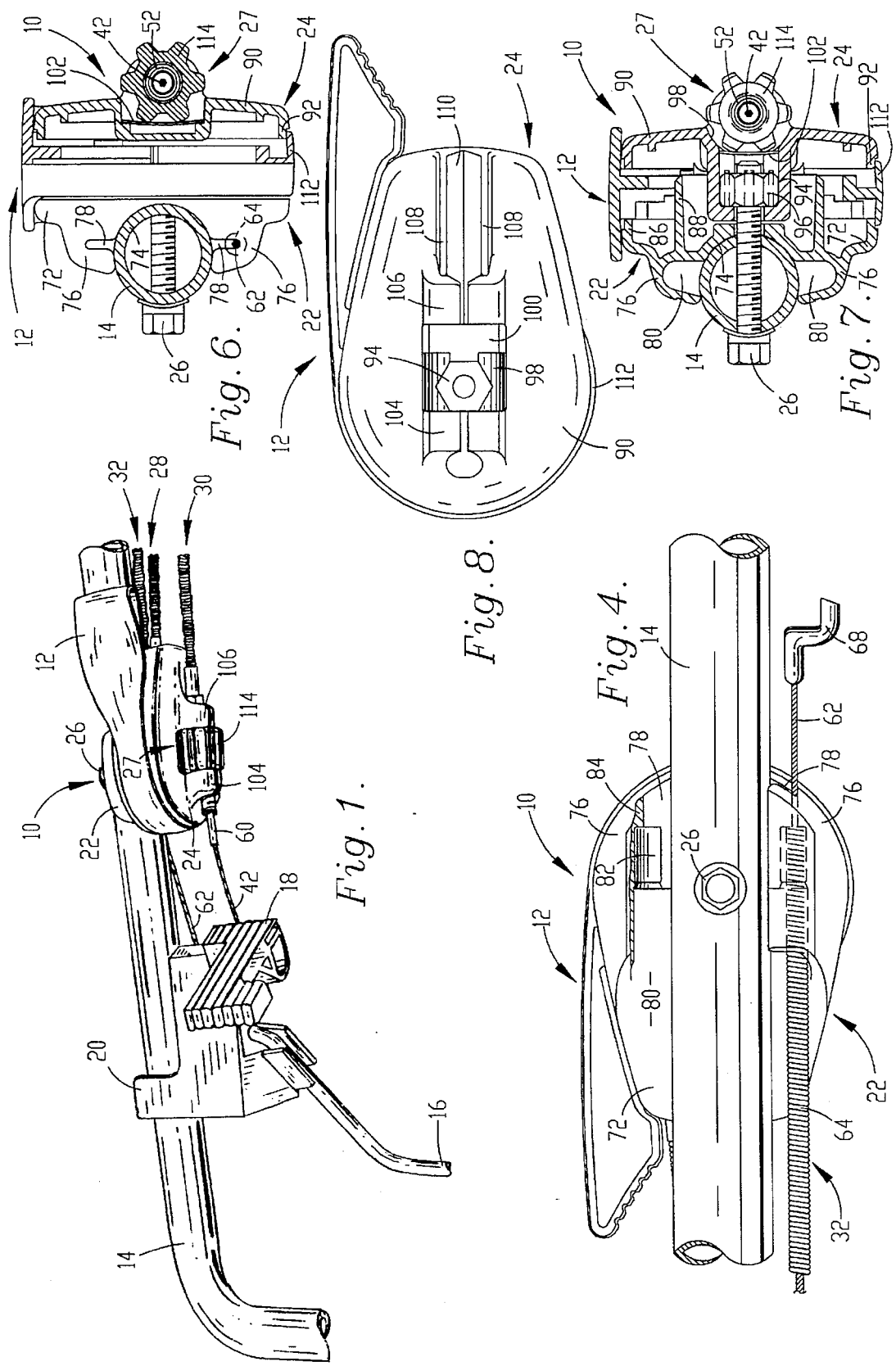

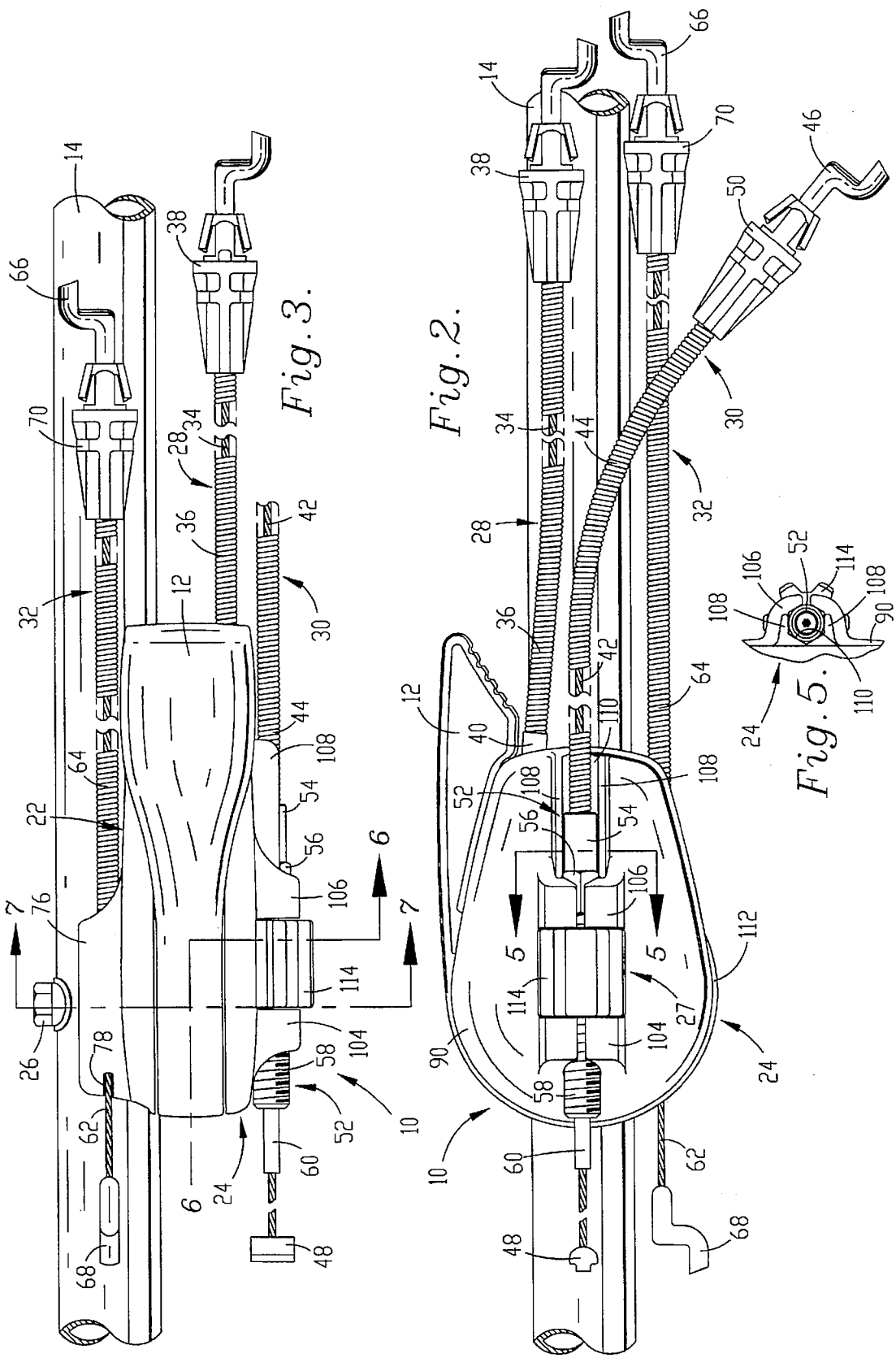

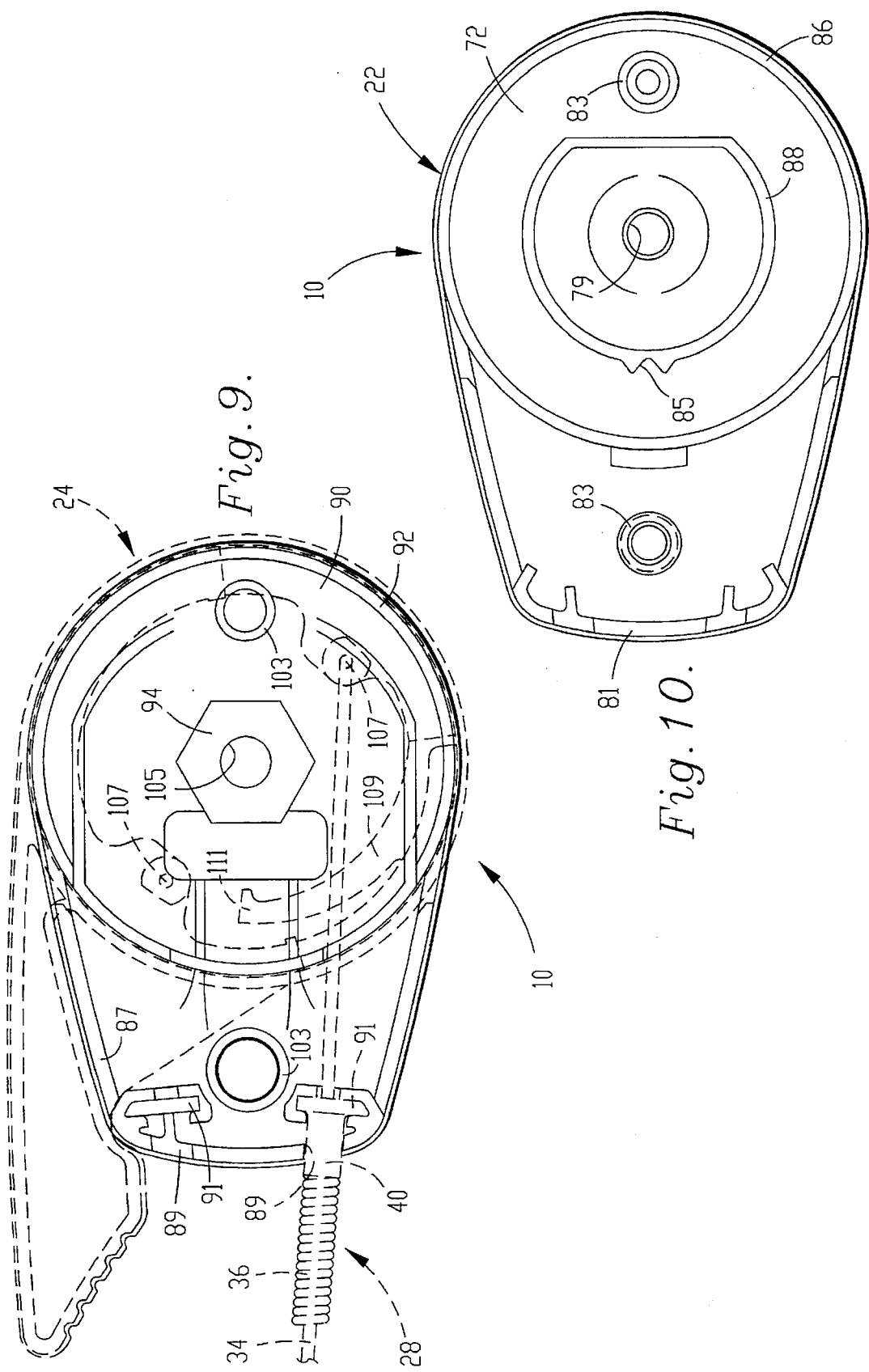

LAWNMOWER CABLE CONTROL APPARATUS

BACKGROUND OF THE INVENTION

1. Field of the Invention

The present invention relates generally to cable control devices and, more particularly, to an adjustable cable control apparatus for use in supporting a plurality of cables on the handlebar of a walk behind lawnmower, and being capable of removing slack between the ends of a cable in such a control device.

2. Discussion of the Prior Art

It is known to provide a cable assembly for use on a walk-behind lawnmower for transmitting movement between actuating levers mounted on the handlebar of the lawnmower and several different possible control mechanisms mounted on the mower deck remote from the handlebar. For example, in certain lawnmowers, a ground drive control mechanism is provided for controlling the transmission of power to the wheels of the mower, and a blade control mechanism may also be provided for controlling the transmission of power to the mower blade. A throttle is usually also provided on conventional lawnmowers for controlling the speed of the motor.

Where a blade control mechanism is not used, a different type of safety means is provided for rendering the blade inoperative when the mower is left unattended. Typically, such a means includes a cable controlled secondary operation that must be made to allow the operator of the mower to start the engine.

The cable assemblies used to operate these various types of mechanisms include cables that are supported for translational movement within outer conduits, wherein each cable is connected between an actuating lever supported on the handlebar of the mower and the associated control mechanism. The conduits of each cable are also supported between the levers and the control mechanisms, but are fixed in place on the mower to guide shifting movement of the cables and permit the lever movement to be transmitted to the control mechanisms. An example of a specific throttle control is provided in U.S. Pat. No. 5,321,994, to Barnard, the disclosure of which is incorporated herein by this express reference.

On mowers including a throttle, a ground drive control mechanism, and some form of safety means, three different levers are supported on the handlebar of the mower, and three cables extend from the handlebar to the mower deck. This presents a need for a plurality of fasteners for supporting the levers and cables on the handlebar, and requires a substantial amount of labor to install the cable control devices. In addition, the use of so many parts also presents a problem of aesthetics.

Under usage conditions, the effects of aging and wear tend to loosen the belts and cables of at least the ground drive assembly, creating slack in the coupling between lever and the ground drive control mechanism. Such slack must be removed in order to maintain proper functioning of the assembly. It is known to provide an adjustment coupling for adjusting the position of one end of the conduit in order to take up the slack in the cable. The adjustment coupling presents yet another part to mount on the handlebar of the mower, and includes a pair of elements, one of which may be threaded into and out of the other to permit the position of the one end of the conduit to be adjusted.

OBJECTS AND SUMMARY OF THE INVENTION

It is an object of the present invention to provide a single cable control apparatus that secures all of the cables extending along the handlebar in place so that additional fasteners are not required and the cables are retained in proper alignment with the control levers to which they are connected.

It is another object of the invention to provide a cable control apparatus that includes a cable adjustment apparatus for adjusting the position of the outer conduit of at least one of the cables to adjust the length of conduit extending between the adjustment apparatus and the associated control mechanism on the mower.

In accordance with these and other objects evident from the following description of a preferred embodiment of the invention, a cable control apparatus includes a housing for supporting the outer conduits of at least two of the mower cables at a fixed position on the handlebar, a fastener for fastening the housing to the handlebar, and a throttle lever supported on the housing for pivotal movement. The free end of one of the cables is connected to the throttle lever so that movement of the lever is transmitted to the motor by the cable, adjusting the speed of the motor. The free end of another one of the cables extends beyond the cable control apparatus and is connected to a ground drive lever that is supported on the handlebar so that movement of the ground drive lever is transmitted to the ground drive assembly.

One of the cables preferably includes an elongated fitting having a first end adapted for attachment to the conduit and presenting a polygonal cross-sectional shape, and a second free end having a threaded outer surface. A cable adjustment apparatus is preferably employed on the control apparatus, and includes a housing presenting a polygonal channel sized for receipt of the fitting so that engagement between the first end of the fitting and the channel prevents the fitting from rotating relative to the housing, a turnbuckle including a threaded inner surface sized for engagement with the threaded second end of the fitting, and a means for supporting the turnbuckle at a fixed axial position along the channel and for allowing the turnbuckle to be rotated so that the position of the fitting in the channel is adjusted by rotation of the turnbuckle. In addition, a detent means is provided for biasing the turnbuckle toward each of a plurality of rotational positions so that the biasing force must be overcome to rotate the turnbuckle from each position in either direction.

By providing a construction in accordance with the present invention, numerous advantages are realized. For example, by allowing a plurality of cables on the lawnmower to be positioned and fastened in place on the handlebar by a single fastener, the cost of additional pieces and the time of added labor is saved, and the aesthetics of the lawnmower are improved. In addition, the control apparatus aligns each cable with the associated lever to which it is to be attached, simplifying assembly and minimizing fatigue on the cables during use.

An advantage obtained by employing the adjustment apparatus of the present invention resides in being able to take up slack in the cable for the ground drive control mechanism so that as the lawnmower ages, it is not necessary to make complicated or time consuming adjustments to the entire cable control apparatus. In addition, by providing a biasing means for biasing the turnbuckle of the adjustment apparatus toward each of a plurality of rotational positions, vibration of the mower does not effect the adjustment of the cable, but manual adjustment is possible without the use of tools.

BRIEF DESCRIPTION OF THE DRAWING FIGURES

The preferred embodiment of the invention is described in detail below with reference to the attached drawing figures, wherein:

FIG. 1 is a fragmentary perspective view of a walk-behind lawn mower handlebar, illustrating a cable control assembly constructed in accordance with the preferred embodiment;

FIG. 2 is a fragmentary side elevational view of the handlebar, illustrating the control assembly;

FIG. 3 is a fragmentary top plan view of the handlebar, illustrating the control assembly;

FIG. 4 is a fragmentary side elevational view of the handlebar, illustrating the side of the control assembly opposite to that shown in FIG. 2;

FIG. 5 is a fragmentary sectional view of the control assembly taken along line 5—5 of FIG. 2, illustrating a cable adjustment apparatus forming a part of the assembly;

FIG. 6 is a sectional view taken along line 6—6 of FIG. 3;

FIG. 7 is a sectional view taken along line 7—7 of FIG. 3;

FIG. 8 is a side elevational view of a housing of the control;

FIG. 9 is a side elevational view of one housing component of the control assembly; and FIG. 10 is a side elevational view of another housing component of the control assembly.

DETAILED DESCRIPTION OF A PREFERRED EMBODIMENT

A cable control apparatus 10 for use in transmitting movement between a throttle lever 12 and the engine of a lawnmower is illustrated in FIG. 1. In the preferred embodiment, the apparatus is employed in a conventional walk-behind lawnmower, including a mower deck supported on wheels, a blade suspended from the deck, an engine or motor supported on the deck and connected to the blade, a shroud or cover extending over the engine or motor elements, and a handlebar 14 extending upward from the deck. The handlebar supports a hand-actuated safety bail 16, the cable control apparatus 10, and at least one additional bail or lever 18 for operating a ground drive control mechanism that controls the transmission of power to the wheels of the mower.

The safety bail 16 is supported on the handlebar by a bracket 20, and is connected to a safety means for rendering the mower blade inoperative when the safety bail is released. In one form of the invention, the safety means includes a blade control mechanism for engaging drive to the blade of the mower when the bail is held against the handlebar. In another form of the invention, the safety means presents a secondary operation that is necessary to release the drum brake from around the flywheel of the mower to allow the operator to start the engine. The cable connected to the safety bail is supported for translational movement within an outer conduit for transmitting movement of the bail to the safety means.

The additional lever 18 is preferably supported on the handlebar by the same bracket 20 as the safety bail, and is connected to the ground drive control mechanism so that movement of the lever is transmitted to the mechanism.

The control apparatus 10 is supported on the handlebar below the safety bail and lever, and generally includes a two-piece housing formed by pieces 22, 24, a fastener 26 for securing the apparatus to the handlebar, and the throttle lever 12 that is supported on the housing for pivotal movement about an axis parallel to the length of the fastener. As described in more detail below, the housing is provided with means for supporting all three cable assemblies employed in the preferred embodiment so that additional fasteners are not required and the cable assemblies are "managed" by the control apparatus. In addition, a cable adjustment apparatus 27 is supported on the housing piece 24 for removing slack between the ends of one of the cable assemblies.

Three cable assemblies 28, 30, 32 are shown in the preferred embodiment. The first cable assembly 28 is connected between the throttle lever 12 and the engine for transmitting movement of the lever to the engine to control the speed at which the engine is running. As shown in FIG. 2, the cable assembly includes a cable 34 supported for translational movement within an outer conduit 36. The cable 34 is preferably a single strand of thick metal wire well-suited for transmitting axial shifting movement within the conduit. However, any other cable material may be used so long as the material is capable of bearing the loads necessary to permit the cable to transmit forces between the throttle lever and the engine. Each end of the cable is bent to define a connector for enabling the cable to be attached to the throttle lever at one end and to the engine at the other end.

The conduit 36 of the first cable assembly is preferably a Bowden wire conduit which includes a wire that is coiled like a spring. Alternately, the conduit may be formed of multiple wires that are wound in a helix. These constructions provide a flexible conduit that receives the innerwire for relative axial shifting movement while restricting buckling of the innerwire. If desired, a thermoplastic resin material can be extruded or otherwise applied over the conduit for weather-proofing purposes.

Each end of the conduit 36 is provided with a fitting for supporting the conduit on the lawnmower. The fitting 38 at the lower end of the conduit is generally tubular, presenting a first end that is press-fit or otherwise attached to the conduit, and a second free end. The free end includes a means for providing a snap-fit connection between the fitting and the shroud. This means preferably includes a pair of spring-biased fingers that are compressed inward as the free end is pushed through an opening formed in the shroud, and expand radially outward on the inside of the shroud to retain the fitting within the opening. The cable 34 extends through the fitting 38 and the shroud, and is connected to the engine.

The fitting 40 at the upper end of the conduit is also generally tubular, and is press-fit or otherwise attached to the conduit 36. The fitting 40 presents a circumferential flange by which the conduit is captured by the housing to support the conduit at a fixed position on the control apparatus while the innerwire or wire is permitted to move within the conduit, as shown in FIG. 9.

Returning to FIG. 2, the second cable assembly 30 is connected between the ground drive lever 18 and the ground drive control mechanism for transmitting movement of the lever to the mechanism to control the transmission of drive to the wheels of the mower. The cable assembly 30 includes a cable 42 supported for translational movement within an outer conduit 44. The cable is of a multi-strand metal construction. Each end of the cable is provided with a connector for enabling the cable 42 to be attached to the lever 18 at one end and to the ground drive control mechanism at the other end. The lower connector 46 is a Z-shaped hook and the upper connector 48 is a generally cylindrical plug extending transverse to the length of the cable so that the plug can be gripped by the lever on both sides of the cable.

The conduit 44 of the second cable assembly is of a construction similar to the first conduit 36, and each end of the conduit is provided with a fitting for supporting the conduit on the lawnmower. The fitting 50 at the lower end of the conduit is identical to the lower fitting 38 provided on the first conduit.

The fitting 52 at the upper end of the conduit is also generally tubular, and is press-fit or otherwise attached to the conduit. The fitting 52 presents three longitudinal sections 54, 56, 58. The first section 54 is cylindrical, and overlies the conduit so that the fitting can be securely retained in place at the upper end of the conduit. The intermediate section 56 includes a polygonal cross-sectional shape presenting a plurality of flat side faces by which the fitting may be gripped to prevent the conduit from being rotated about its longitudinal axis. Preferably, the cross-sectional shape of the intermediate section is hexagonal, but other flat sided shapes are also suitable. The third longitudinal section 58 of the fitting is cylindrical, presenting a threaded outer surface that permits the position of the fitting to be adjusted relative to the control apparatus in a manner described more fully below. An inner sleeve 60 may be provided at the upper end of the conduit which extends through the fitting. The sleeve guides the cable within the fitting and prevents metal-to-metal contact between the cable and the fitting, reducing wear due to abrasion.

The third cable assembly 32 includes a cable 62 supported for translational movement within an outer conduit 64. The cable is preferably of a multi-strand construction similar to the cable, and includes connectors at each end for enabling the cable to be attached to the bail at one end and to the safety means at the other end. The lower connector 66 is a Z-shaped hook or the like which permits the cable to be gripped by the safety means and the upper connector 68 is a Z-shaped hook that can be secured to the bail.

The conduit 64 of the third cable assembly is preferably a Bowden wire conduit similar to the conduits 36, 44. The lower end of the conduit 64 is provided with a fitting 70 for supporting the conduit on the shroud of the lawnmower. Preferably, the fitting is identical the fittings 38, 50 provided at the lower ends of the other conduits 36, 44. The upper end of the conduit 64 is not provided with a fitting, and is left unmodified, as shown in FIG. 4.

Turning to FIG. 7, the housing of the cable control apparatus is formed of the two pieces 22, 24 which are molded thermoplastic resin parts that are secured together and fastened in place on the handlebar of the lawnmower. The inner piece 22 adjacent the handlebar includes a side wall 72 having a tear-drop shape, as shown in FIG. 4, presenting a circular end region that tapers off toward the opposite end of the side wall. As illustrated in FIG. 7, the outside surface of the side wall includes a longitudinally extending arcuate channel 74 having a diameter substantially equal to the diameter of the tubing used in the handlebar 14 so that the housing nests against the handlebar when assembled. The piece 22 is built up with material along the upper and lower sides of the channel so that the piece wraps partially around the handlebar along at least a section of the length of the channel. Each built-up section 76 includes a slot 78 that extends longitudinally along the channel in communication with the channel. Each slot is divided into three longitudinal sections 80, 82, 84, as shown in FIG. 4.

The first section 80 presents a U-shaped inner surface sized for receipt of the conduit of the third cable assembly. The intermediate section 82 is key-shaped in cross section, presenting a tubular slot portion that is spaced from and in communication with the channel. The tubular slot portion is sized for receipt of the conduit 64 of the third cable assembly 32 so that when the cable assembly 32 is positioned in the slot with the conduit 64 received in the intermediate section 82, and the housing is secured to the handlebar, the conduit is retained in place. The third longitudinal section 84 of the slot presents an end wall to the intermediate section for preventing the conduit from being pushed upward along the handlebar beyond the cable control apparatus. As illustrated in FIG. 6, the size of the slot along the third section is thus only large enough to permit passage of the cable 62 while restricting the conduit 64.

The slots 78 are provided both above and below the channel so that the housing can be mounted in any orientation on the handlebar, for example on either the left or right arm thereof, without affecting the position at which the third cable assembly is supported relative to the handlebar. Alternately, the construction permits an additional cable assembly to be supported on the control apparatus in addition to the cable assemblies 28, 30, 32. Thus, although only three cable assemblies are illustrated in the preferred embodiment, a fourth could also be supported by the apparatus.

Turning to FIG. 10, a circular flange 86 extends inward from the side wall at the circular end region of the piece 22 for supporting the throttle lever 12 and guiding pivotal movement thereof relative to the housing. A transverse hole 79 extends through the piece along the axis of the circular flange for permitting attachment of the housing to the handlebar. An edge flange 81 is also provided along the tapered region of the piece 22 and extends inward from the side wall 72. The flange 81 cooperates with the second housing piece 24 to close off the interior of the housing when assembled. A pair of tubular pins 83 protrude laterally inward from the side wall for positioning the piece relative to the piece upon assembly. A generally circular inner wall 88 protrudes laterally inward from the side wall within the area defined by the circular flange, and presents an outer circumferential surface defining a detent 85 that cooperates with the throttle lever to hold the lever in the position shown in the figures.

As shown in FIG. 7, the second housing piece 24 presents a side wall 90 that is parallel to the side wall 72 of the first piece 22 upon assembly of the housing. The side wall 90 is of the same shape as the side wall 72, as illustrated in FIG. 9, and includes an inward directed, arcuate flange 92 along the circular end region thereof for supporting the throttle lever 12 and guiding pivotal movement thereof. An inward-directed flange 87 also extends along the tapered region of the side wall 90 for closing off the interior of the housing upon assembly. The flange 87 is interrupted at the front or tapered end of the piece by a pair of slots 89 that are sized for receipt of the upper fitting of the first conduit 36. A socket 91 is formed in the piece 24 inside of each slot, and is sized for receipt of the flange of the fitting 40 so that the fitting when positioned with the flange received in the socket is retained in place on the housing and is not permitted to be shifted axially.

The two slots 89 and sockets 91 are provided to permit the apparatus to be positioned on either the left or right side of the handlebar without changing the relative positions of the cable assemblies to one another. Thus, a single construction of the apparatus may be assembled in different places on the handlebar while permitting the cable assemblies to be supported in a predetermined relationship relative to the throttle lever, safety bail, and ground drive control lever. This eliminates the need for different constructions for every application, increasing the versatility of the apparatus.

A pair of tubular sleeves 93 extend laterally inward from the side wall in alignment with the pins 83 of the piece 22, and receive the pins to align the pieces 22, 24 with one another upon assembly, as shown in FIG. 7. Returning to FIG. 9, a hollow polygonal hub 94 extends laterally inward from the side wall 90 along the axis of the arcuate flange 92, and defines a socket within which a lock nut 96 is retained. Preferably, the socket and lock nut are hexagonal, although other shapes may be used which prevent the lock nut from rotating within the socket. The socket includes a bottom wall at the inner end thereof, and a hole 105 extends through the bottom wall and is sized for receipt of the threaded fastener 26, as shown in FIG. 7. Preferably, the fastener 26 is a bolt.

As shown in FIG. 8, the socket defined by the hub 94 opens up to the outer surface of the side wall 90 within a longitudinally extending depression extending into the side wall. The depression presents a first inner wall section 98 that is curved along the length of the socket opening and a second inner wall section is flat at one end of the depression. The flat section 100 is also stepped at each lateral end to space the inner wall from a pair of steps adapted to support a flat, rectangular metal leaf spring 102 so that the leaf spring can be deformed without hitting against the inner wall section 100.

A pair of lugs 104, 106 are formed in the piece 24 and extend laterally outward at the ends of the depression. The lug 104 includes a longitudinally extending hole sized for receipt of the threaded section of the fitting of the second cable assembly. A longitudinal slit opens the hole to the area outside the lug so that the cable 42 can be threaded into the hole upon assembly. The lug 106 also includes a longitudinally extending hole sized for receipt of the fitting, and a longitudinal slit exposing the hole to the area outside the lug. However, the shape of the hole in the lug 106 is preferably the same as the shape of the intermediate section of the fitting 52 so that when the intermediate section 56 is positioned in the hole the fitting is prevented from rotating relative to the housing.

As shown in FIG. 2, a pair of laterally outward extending spaced walls 108 extend from the lug 106 toward the tapered end of the piece 24 to define a channel 110 within which the fitting 52 is supported, and the walls define opposed flat surfaces that mate with the flat faces of the intermediate fitting section 56 to prevent rotation of the fitting relative to the housing. As illustrated in FIG. 5, the side wall 90 may also include a chevron shape between the upper and lower walls 108 so that the channel 110 has a polygonal shape corresponding to that of the polygonal section of the upper fitting 52. By providing this construction, the fitting is guided for axial translational movement within the channel while being prevented from rotating relative to the housing.

As shown in FIG. 3, the throttle lever 12 is sandwiched between the two housing pieces 22, 24 upon assembly of the apparatus and includes an annular wall 112 adapted to ride on the flanges of the pieces 22, 24 between a plurality of pivotal positions about the axis defined by the fastener 26. A handle protrudes from the annular wall for permitting the lever to be manipulated during use. As shown in FIG. 9, one or more eyelets 107 are provided in the annular wall for receiving the bent upper end of the first cable 34 so that when the lever is pivoted relative to the housing the cable is shifted axially within the conduit 36 and carries out adjustment of the speed of the engine. A finger 109 protrudes radially inward from the annular wall of the lever along a spiral path, and presents a pawl 111 sized for receipt within the detent of the circular inner wall 88. The finger is resilient so that the pawl can be forced from the detent when the lever is physically moved from the position shown in the figures, allowing the throttle to be adjusted.

The cable adjustment apparatus 27 is shown in FIG. 6, and includes the leaf spring 102 that is supported in the depression of the housing piece 24, the fitting 52 of the second cable assembly 30, the channel 110 in the housing piece 24, shown in FIG. 2, and a turnbuckle 114 supported on the fitting 52 between the lugs 104, 106. The turnbuckle 114 is generally tubular, presenting an inner surface that is threaded for receipt on the threaded section 58 of the fitting 52, and an outer surface including a plurality of elongated ribs separated circumferentially from one another by longitudinal depressions. The fitting 52 is retained in the channel 110 by the lugs 104, 106 which permit longitudinal shifting of the fitting but prevent the fitting from being pulled laterally from the housing. The turnbuckle 114 is retained on the fitting 52 between the lugs and within the depression, and is rotatable so that axial shifting movement of the fitting is carried out. Returning to FIG. 6, the leaf spring 102 engages the turnbuckle and biases it toward each position in which the spring rests between adjacent ribs of the turnbuckle. Thus, the turnbuckle is held against rotation so that vibration of the mower does not alone cause rotation of the turnbuckle and positive manipulation of the turnbuckle is required to adjust the longitudinal position of the fitting.

As illustrated in FIG. 3, all three cable assemblies are supported on the cable control apparatus in orientations already aligned with the throttle lever, the ground drive control lever and the safety bail, and only a single fastener is necessary for securing the control apparatus to the handlebar. Thus, it is not necessary to individually position and secure each cable assembly to the handlebar, presenting a savings in both parts and labor. Once the apparatus is assembled on the lawnmower, the levers and the bail may be selectively actuated to control the various operations of the lawnmower, and the conduit of each cable assembly is securely held in place on the mower while the cables are permitted to be shifted axially to transmit movement from the levers and the bail to the mower.

If, after time, the belts associated with the ground drive control mechanism, or the cable itself stretch due to wear, it is possible to take up the slack in the second cable assembly by manipulating the cable adjustment apparatus. Specifically, by rotating the turnbuckle, the fixed position of the fitting at the upper end of the conduit is shifted relative to the lower end. When the upper end is moved toward the lower end, the path along which the cable is guided is lengthened, removing slack from the cable.

Although the present invention has been described with reference to the preferred embodiment illustrated in the attached drawing figures, it is noted that substitutions may be made and equivalents employed herein without departing from the scope of the invention as recited in the claims.

What is claimed is:

1. A cable adjustment apparatus for use with a cable that is supported for translational movement within an outer conduit, the apparatus comprising:

an elongated fitting including a first end adapted for attachment to the conduit and presenting a polygonal cross-sectional shape, and a second free end having a threaded outer surface;

a housing presenting a polygonal channel sized for receipt of the fitting so that engagement between the first end of the fitting and the channel prevents the fitting from rotating relative to the housing;

a turnbuckle including a threaded inner surface sized for engagement with the threaded second end of the fitting;

a means for supporting the turnbuckle at a fixed axial position along the channel and for allowing the turnbuckle to be rotated so that the position of the fitting in the channel is adjusted by rotation of the turnbuckle the means for supporting the turnbuckle including a pair of lugs that are fixed to the housing and spaced from one another by a distance substantially equal to the length of the turnbuckle, the lugs presenting holes that are aligned with the channel for receiving the fitting of the conduit so that the fitting extends through the channel, the lugs, and the turnbuckle, and is held in place within the channel by the lugs; and a detent means for biasing the turnbuckle toward each of a plurality of rotational positions so that a biasing force must be overcome to rotate the turnbuckle from each position in either direction, wherein the housing includes a recess extending between the lugs for receiving the turnbuckle for rotation about an axis aligned with the holes in the lugs, the recess being stepped for receipt of the detent means.

2. A cable adjustment apparatus as recited in claim 1, wherein each said lug is split for permitting the cable to be threaded onto the apparatus during assembly.

3. A cable adjustment apparatus as recited in claim 1, wherein the detent means includes a leaf spring positioned in the recess of the housing and retained in position by the turnbuckle upon assembly of the apparatus.

* * * * *